(12) United States Patent
Merwarth

(10) Patent No.: US 6,280,136 B1
(45) Date of Patent: Aug. 28, 2001

(54) BUNDLE TURNER

(75) Inventor: Richard Merwarth, Bay Village, OH (US)

(73) Assignee: Total Mailroom Support, Inc, Middleburg Heights, OH (US)

( * ) Notice: Subject to any disclaimer, the term of this patent is extended or adjusted under 35 U.S.C. 154(b) by 0 days.

(21) Appl. No.: 09/316,480

(22) Filed: May 21, 1999

Related U.S. Application Data

(60) Provisional application No. 60/086,893, filed on May 27, 1998.

(51) Int. Cl.[7] .................................................. B65G 47/244
(52) U.S. Cl. ......................... 414/754; 414/757; 414/816; 198/401; 198/414
(58) Field of Search ..................................... 414/816, 754, 414/757, 777, 784; 198/373, 374, 401, 411–414

(56) References Cited

U.S. PATENT DOCUMENTS

| | | | |
|---|---|---|---|
| 3,100,039 | * | 8/1963 | Oderman et al. ...................... 198/414 |
| 3,295,660 | * | 1/1967 | Nelson ................................... 198/414 |
| 3,442,410 | * | 5/1969 | Solomonson ......................... 198/401 |
| 3,799,320 | * | 3/1974 | V.D. Bilt ............................... 198/401 |
| 4,519,493 | * | 5/1985 | Dyer ..................................... 198/414 |
| 4,781,282 | * | 11/1988 | Fierkens et al. ....................... 198/414 |
| 4,938,334 | * | 7/1990 | McGinn ............................ 198/414 X |
| 4,955,784 | * | 9/1990 | Staszewski et al. .............. 198/414 X |
| 5,000,305 | * | 3/1991 | Lucas ..................................... 198/414 |
| 5,143,198 | * | 9/1992 | Hale et al. ............................. 198/414 |

FOREIGN PATENT DOCUMENTS

| | | | |
|---|---|---|---|
| 35 13 381 | * | 10/1986 | (DE) .................................... 198/414 |
| 61-002608 | * | 1/1986 | (JP) ..................................... 198/414 |
| 61-155118 | * | 7/1986 | (JP) ..................................... 198/414 |

* cited by examiner

Primary Examiner—Robert P. Olszewski
Assistant Examiner—Gerald J. O'Connor
(74) Attorney, Agent, or Firm—Fay, Sharpe, Fagan, Minnich & McKee, LLP

(57) ABSTRACT

An assembly for turning bundles includes a planar surface that receives bundles from an upstream station. A sensor detects movement of the bundle toward the surface and initiates a timing sequence. The sequence includes slowing the bundle over the surface so that it does not contact the stop at high speed. The stop is then retracted after the bundle movement is terminated and a portion of the surface is lifted and rotated through approximately ninety degress to re-orient the bundle. After the bundle is lowered to the planar surface, it is then advanced by a drive assembly from the surface toward a downstream station.

17 Claims, 7 Drawing Sheets

FIG. 8
FIG. 10
FIG. 9
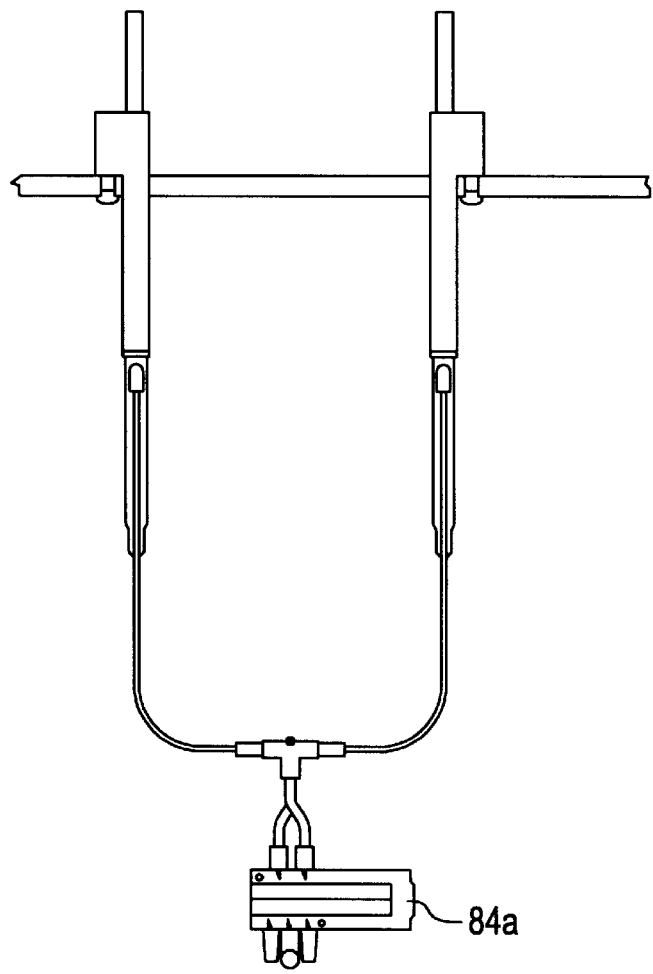
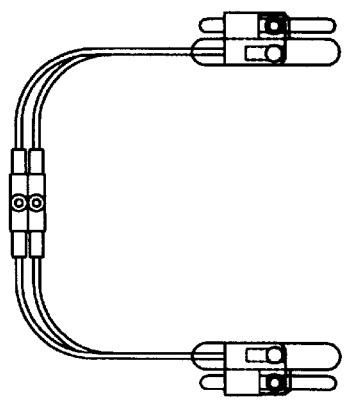
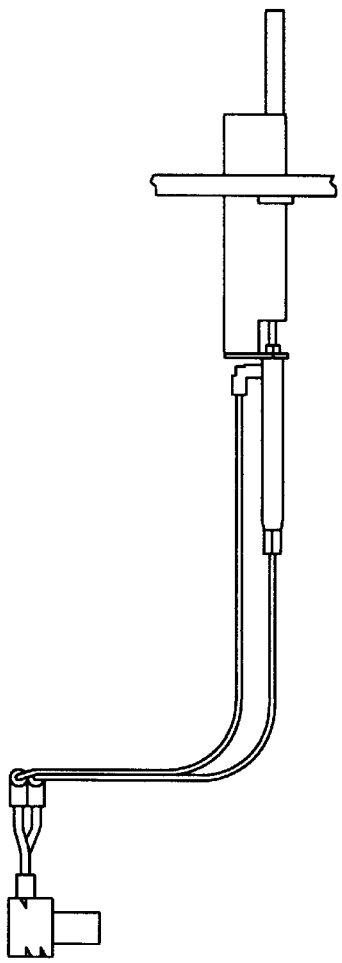

BUNDLE TURNER

CROSS-REFERENCE TO RELATED APPLICATION

This application claims the benefit of U.S. provisional application Serial No. 60/086,893, filed May 27, 1998.

BACKGROUND OF THE INVENTION

The present application is directed to an apparatus used for turning bundles as encountered in the mailroom industry. That is, bundles of printed product, such as newspapers in individual bundles, are advanced downstream in a processing line. Typically, a bundle turn assembly is located between adjacent strapping machines where a strap is placed about a completed bundle in one direction, the bundle rotated through ninety degrees, and a strap then applied to the bundle in a perpendicular direction. Thus, it is necessary to detect the location of the bundle as it proceeds downstream. The bundle is then stopped, rotated, and advanced downstream to the next work station. Of course, it will be appreciated that the invention may find application in other areas and for related environments.

SUMMARY OF THE INVENTION

There is provided an assembly for turning bundles that includes a receiving surface adapted to receive bundles from an upstream station and advance the bundles toward a stop. A lift mechanism lifts and rotates the bundle through approximately ninety degrees. A drive assembly then removes the bundle from the surface and advances it toward a downstream station.

A sensor is preferably provided to detect movement of the bundle toward the surface. A timing sequence is initiated in response to a signal from the sensor. The bundle is slowed over the surface so that the bundle does not contact the stop at high speed. The stop is then retracted after the bundle is stopped and a portion of the surface is lifted and rotated through approximately ninety degrees to re-orient the bundle. The bundle is then advanced from the surface toward a downstream station.

The lift and rotate mechanism is preferably a ring that engages a lower surface of the bundle an d engages the bundle over an annular area during the lift and rotation movement.

A benefit of the invention resides in the ability to accurately receive, stop, rotate, and advance the bundle from the surface.

Another benefit of the invention is found in the simplified structure that performs the bundle rotation.

Still other features and benefits of the invention will become apparent to those skilled in the art upon reading and understanding the following detailed description.

BRIEF DESCRIPTION OF THE DRAWINGS

FIG. 8 is an elevational view of the stop assembly.

FIG. 9 is an end elevational view taken generally from the right-hand side of FIG. 8.

FIG. 10 is a top plan view taken generally from the lines 10—10 of FIG. 9.

DETAILED DESCRIPTION OF THE PREFERRED EMBODIMENT

Figure 1:
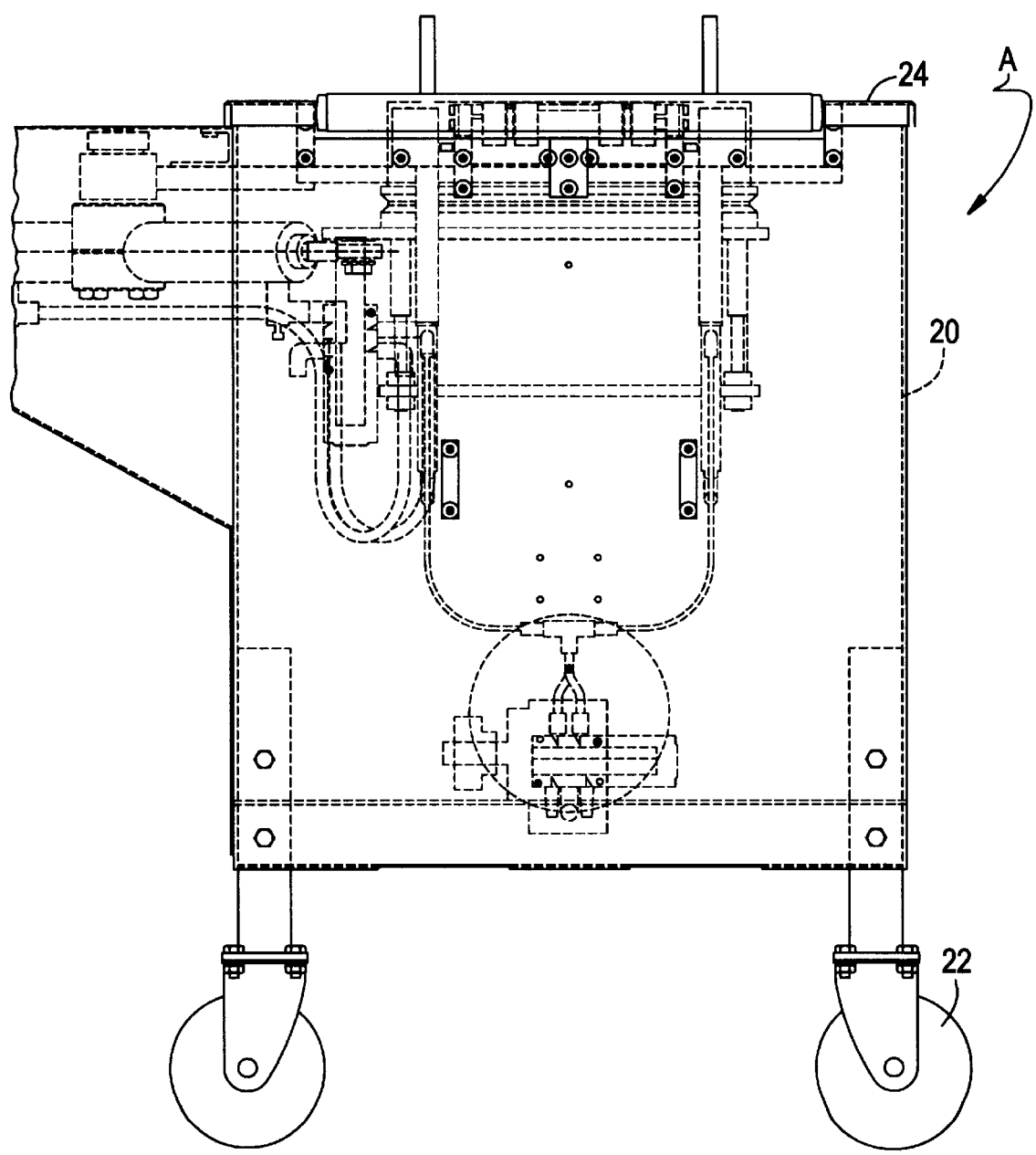
FIG. 1 is an elevational view of a preferred form of bundle turn assembly.
Figure 2:
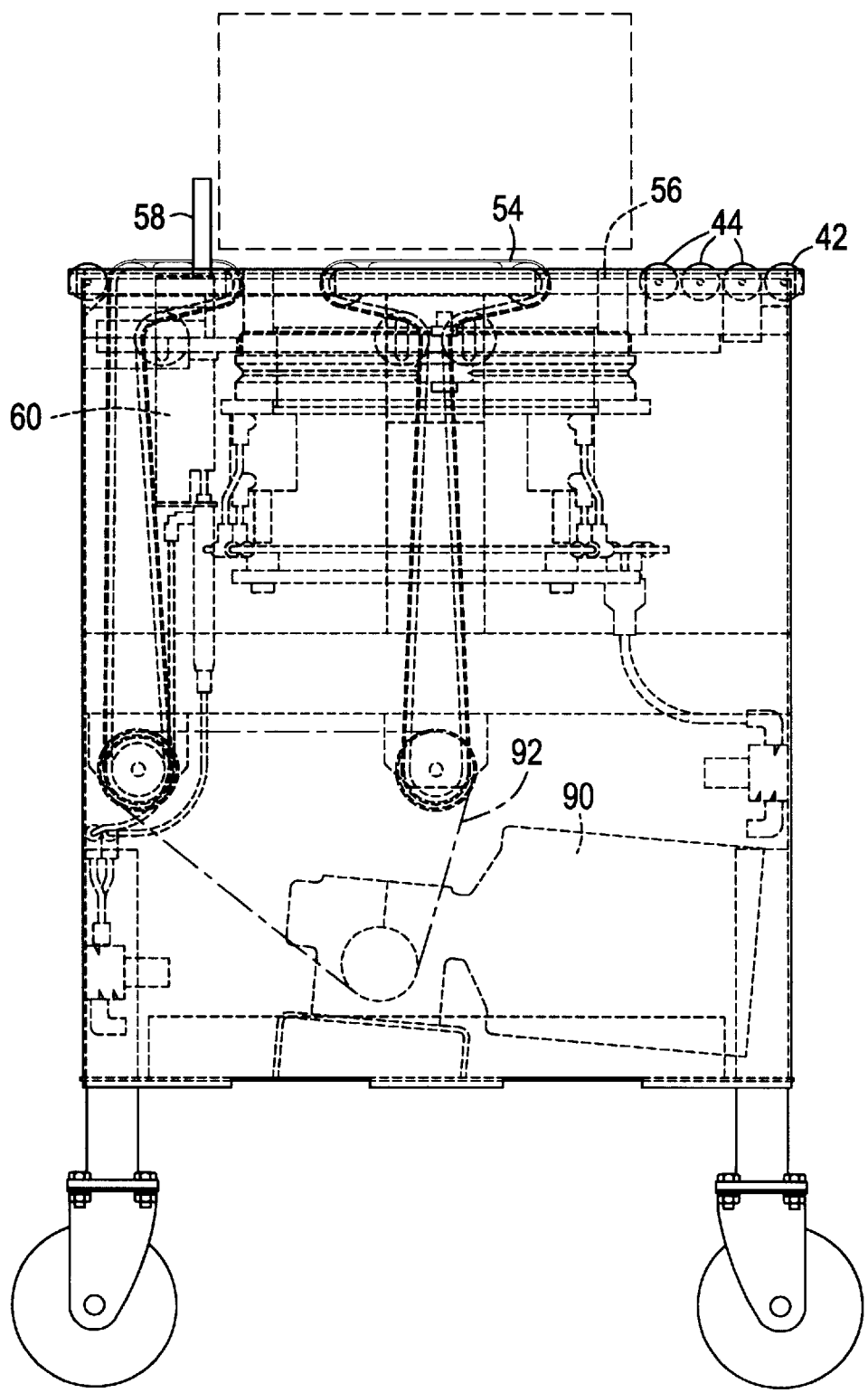
FIG. 2 is an end elevational view taken generally from the right-hand side of FIG. 1.
Figure 3:
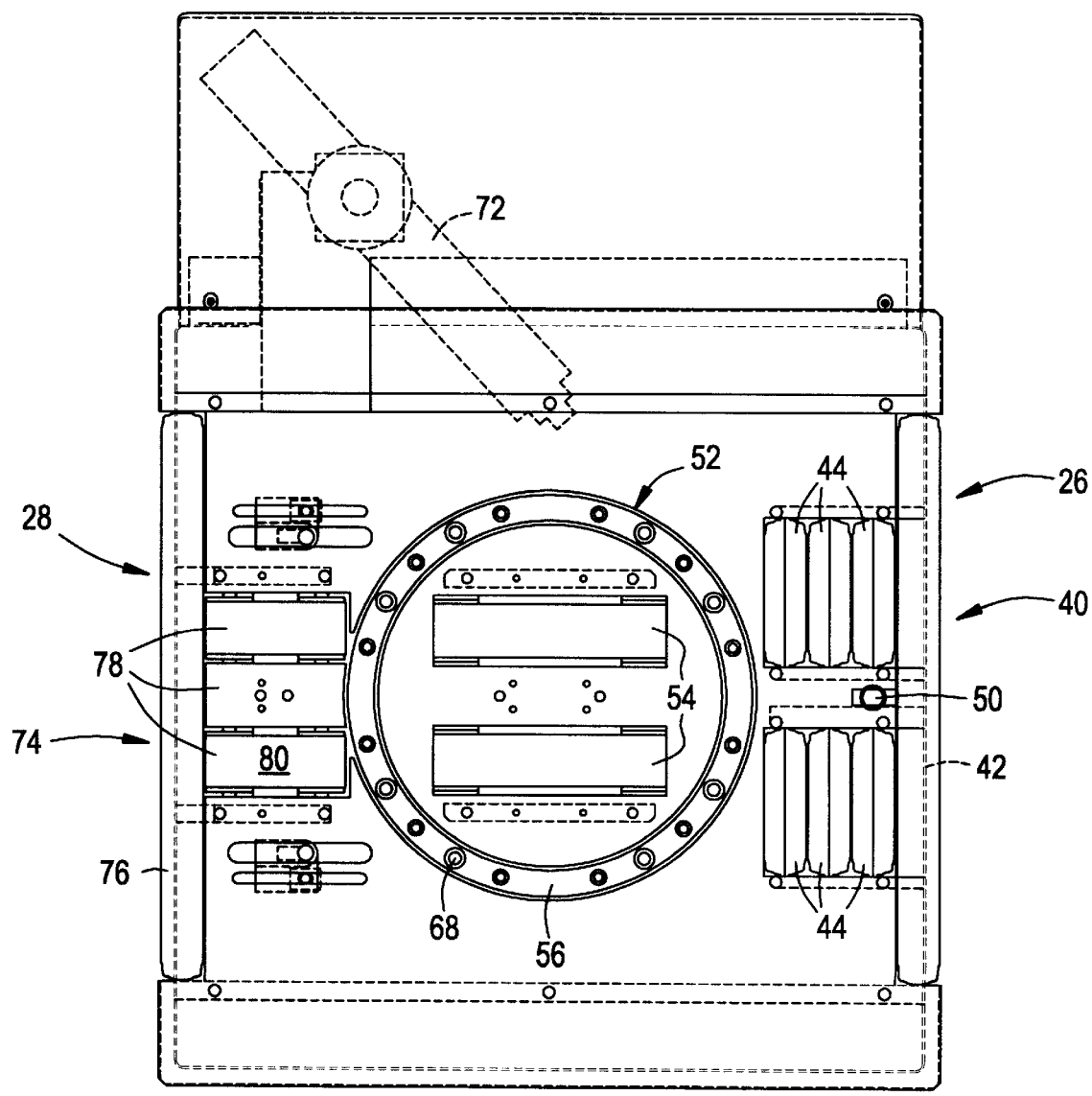
FIG. 3 is a top plan view taken generally along the lines 3—3 of FIG. 2.

Turning initially to FIGS. 1–3, the bundle turn assembly A includes a frame 20 that is preferably on caster wheels 22 so that it can be conveniently positioned at various locations along a process line (not shown). The frame supports a table top 24 (FIG. 3) that has an inlet or upstream portion 26 and a downstream or outlet portion 28. Thus, as illustrated, stacks or bundles of printed products (shown in dotted line in FIG. 2) are received along the right-hand side of FIGS. 2 and 3, stopped centrally on the top surface, and proceed downstream to the left as shown in FIGS. 2 and 3. To facilitate this movement, one or more rollers 40 are provided along the inlet portion 26. In a preferred arrangement, an elongated roller 42 is provided along the peripheral edge of the assembly and a series of smaller length rollers 44 are disposed inboard thereof. As will be appreciated, these rollers each have generally horizontal axes and allow free rolling movement of the bundle thereover.

Positioned between the rollers, or at any other convenient location in the inlet portion 26, is a sensor 50. The preferred form of sensor is a photoelectric element that provides a signal once the bundle enters the inlet portion of the assembly. The sensor starts a timing sequence which ultimately results in the lifting and rotation of the bundle through ninety degrees as described further below.

The bundle proceeds leftwardly as shown in FIGS. 2 and 3 where it proceeds over a central portion 52 that includes at least one drive belt and is in the preferred arrangement, a pair of drive belts 54. The drive belts are synchronously operated and provide a symmetrical engagement along the bottom surface of the bundle, urging the bundle a predetermined amount toward the outlet portion 28. Based on the timing signal provided by the sensor, rotation of these belts is terminated once the bundle is centrally located over a ring 56. This also coincides with engagement of a forward surface of the bundle with stops 58. In a preferred arrangement, the stops are defined by rods that are selectively extended and retracted relative to the table top. The rods are actuated by a piston/cylinder assembly 60 disposed beneath the table. When the rod of the piston/cylinder assembly is extended, the stops 58 protrude upwardly from the upper surface of the table (FIGS. 1 and 2). Leftward movement of the bundle as shown in FIGS. 2 and 3 is then precluded through engagement with the stops. The timer also terminates rotation of the belts 54 at the time that the bundle engages the stops. Thus, the bundle is gradually slowed down by the belts so that it does not engage the stops at a high rate of speed which would otherwise tend to topple the bundle of printed material.

Once the bundle has come to an at-rest position, individual pins 68 circumferentially spaced along the ring 56 are urged upwardly by fluid pressure. That is, a series of individual cylinders are located beneath the table top below the annular ring 56. The pins are simultaneously urged upwardly to lift the bundle a predetermined dimension, for example approximately one inch above the table surface. If desired, two or more pins may be interconnected by an annular plate that receives the bundle thereon and engages the lower surface of the bundle along a substantial portion of an annulus as opposed to discrete pin points.

Once the bundle has been lifted, the ring 56 is rotated by cylinder 72. Thus, the entire ring, including the pins and cylinders that lift the pins upwardly, are rotated ninety degrees by the large cylinder 72. Since the cylinder is disposed at an angle, its stroke rotates the ring, and thus the bundle, and once the ring has completed its ninety degree rotation, the pins are de-actuated or recessed into the ring. The bundle is thus lowered onto the table surface and the belts 54 driven to advance the bundle toward the outlet portion 28.

In a preferred arrangement, outlet rollers 74 facilitate movement of the bundle toward a downstream work station. Particularly, the downstream rollers include an elongated roller 76 along the peripheral edge of the table top and one or more drive rollers 78 that are driven by belts 80 from beneath the table to advance the bundle from the table surface. As will be appreciated, during the rotation and movement of the bundle off the table surface, the stops are recessed below the table surface. Once the bundle is clear of the table surface, the stops are then urged upwardly to their position shown in FIGS. 1 and 2 to receive the next bundle.

Figure 4:
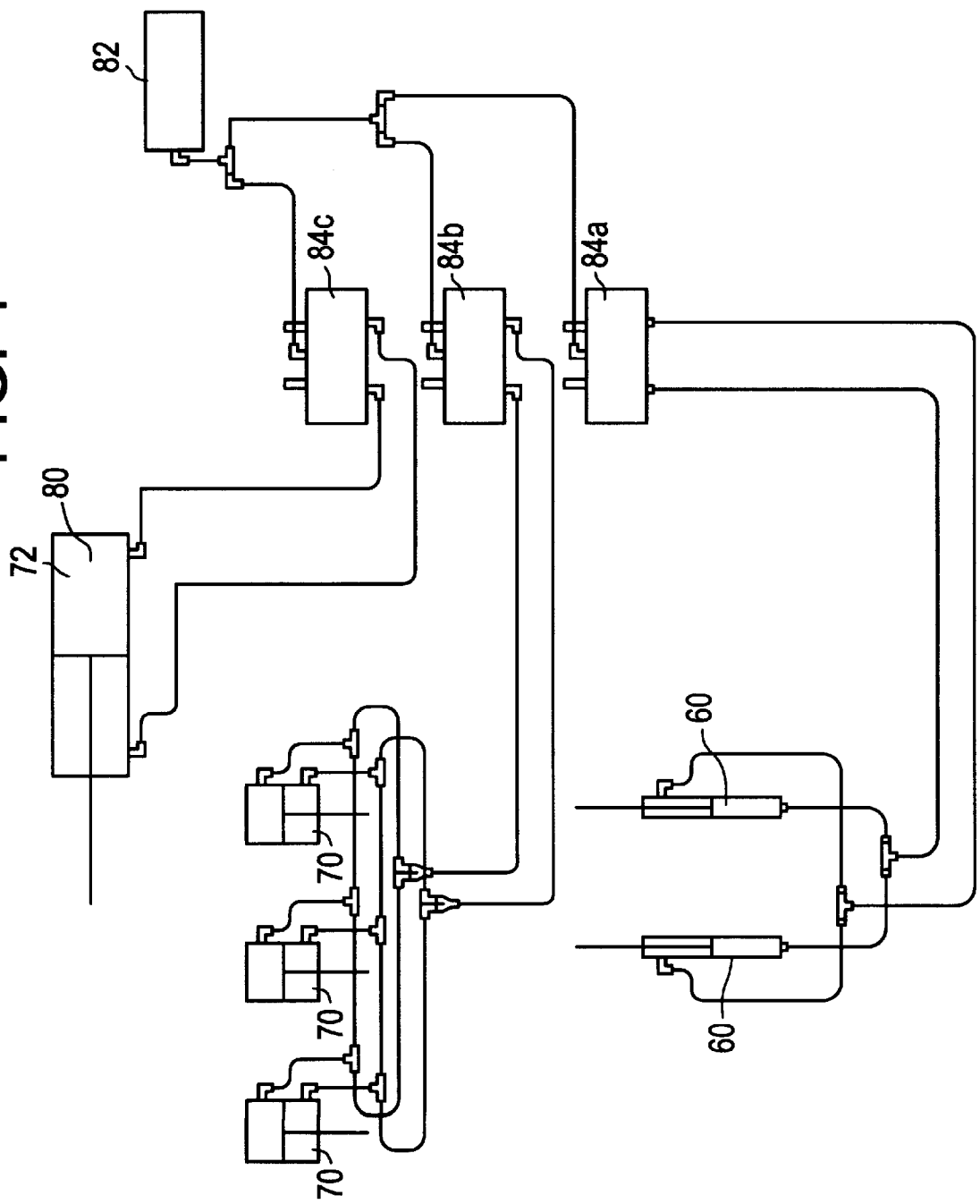
FIG. 4 is a schematic representation of the fluid system used to stop the bundle, lift the bundle, rotate the bundle through ninety degrees, and advance the bundle toward the downstream work station.

FIG. 4 illustrates the fluid system that operates the various cylinders and pins that lift and rotate the bundle. Reference numeral 82 identifies the source of fluid pressure conveyed by way of fluid lines and couplings, and a series of valves 84. Fluid pressure is selectively provided to cylinder 60 that operates the stops. Through the second valve 84b, fluid is simultaneously provided to cylinder 60 associated with the pins 68. Fluid pressure is selectively controlled to cylinder 72 via the third valve 84c. As described above, the cylinder 72 is selectively extended and retracted to impart ninety degree rotation to the ring.

Figure 5:
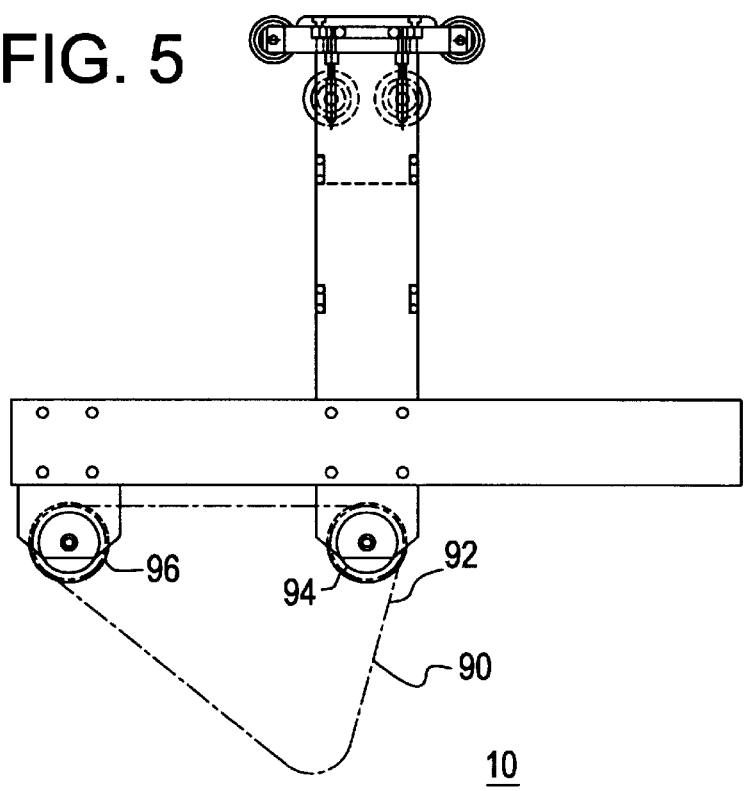
FIG. 5 is an elevational view of the mechanism for driving the belts.
Figure 6:
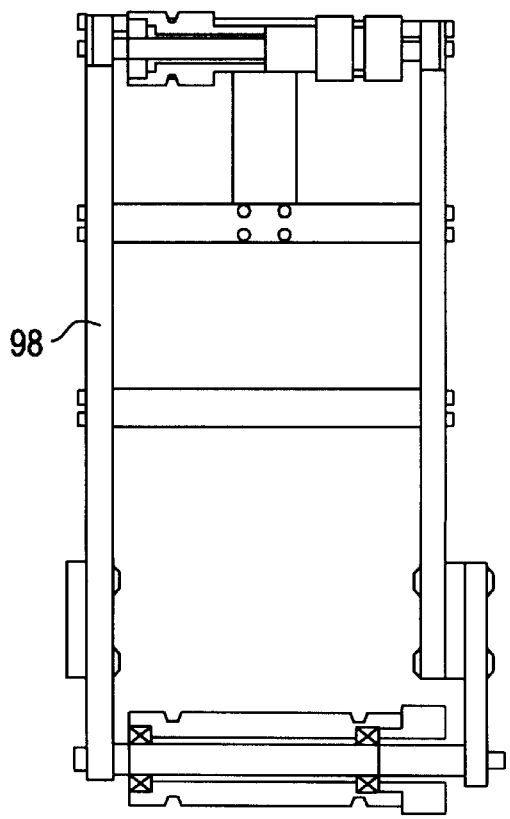
FIG. 6 is an end elevational view taken generally from the right-hand side of FIG. 5.
Figure 7:
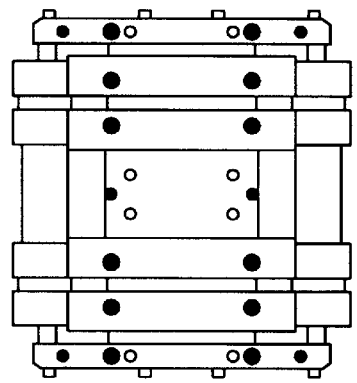
FIG. 7 is a top plan view of the assembly of FIG. 5.
Figure 11:
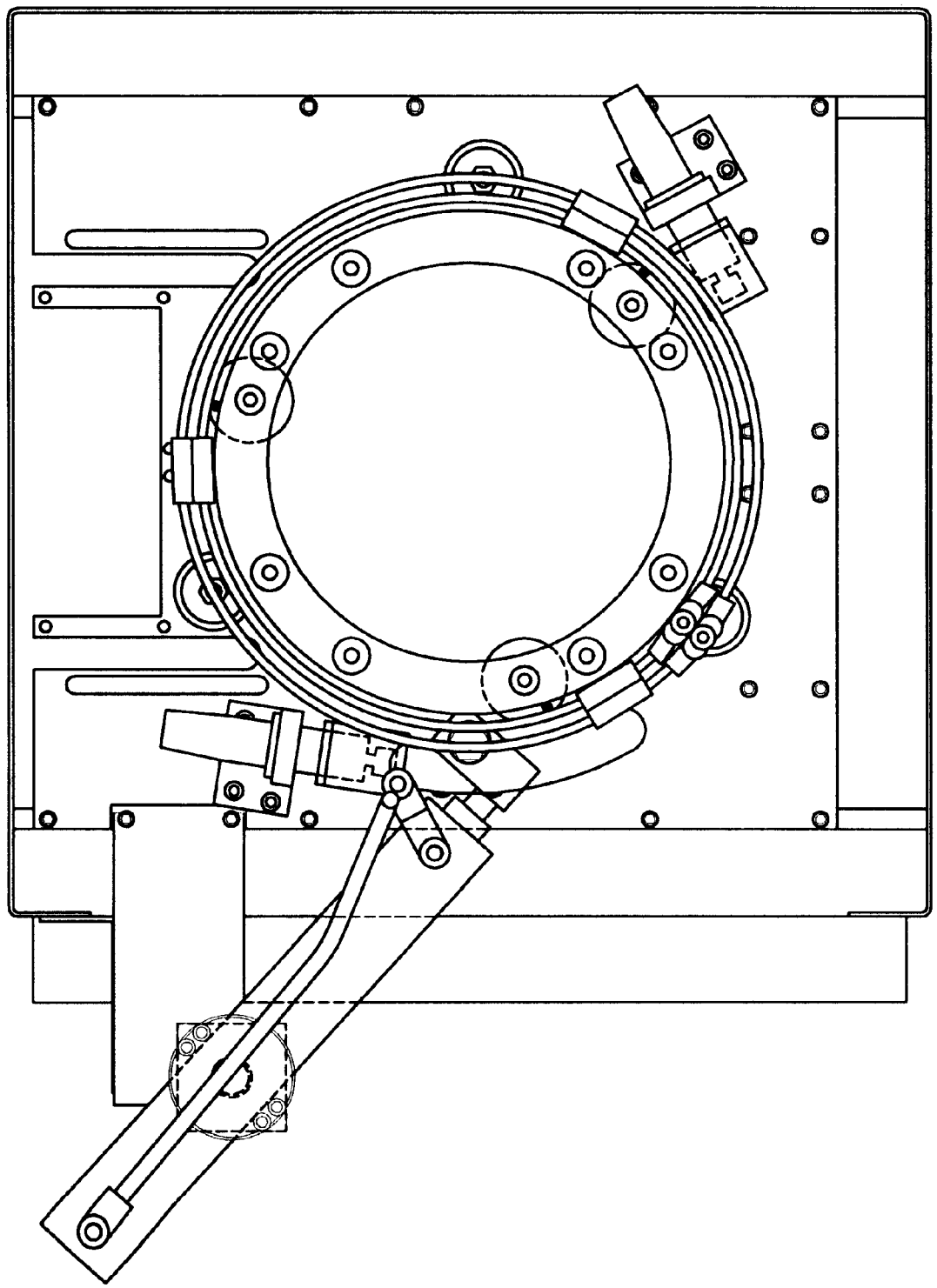
FIG. 11 is a top plan view of the bundle turn assembly with selected components removed for ease of illustration.

FIGS. 5–7 illustrate the drive mechanism for the belts 54 disposed in a central portion of the table surface. As shown, a motor 90 drives a main belt 92. A pair of pulleys 94, 96 are, in turn, driven by the belt and used to drive belts 54 associated with a central portion of the assembly and the belts 80 associated with the outfeed section 28. As will be recognized, these belts 54, 80 are thus driven in synchronous relation since pulleys 94, 96 are driven by the same belt 92. A series of idler and driven pulleys (unnumbered) are used to complete the drive belt circuit in a manner well known in the art. The central column 98 (FIG. 6) stays fixed relative to the frame so that when the ring is selectively rotated by cylinder 72, the drive belts 54 remain oriented in the same direction. Thus, the belts 54 advance the bundle of printed product into engagement with the stops 58, and then selectively assist drive belts 80 to advance the bundle toward the outlet portion 28 of the assembly.

FIGS. 8–10 illustrate the stop mechanism associated with the fluid pressure system. As described above, fluid cylinders 60 cooperate with the stop members 58 as flow is regulated through valve 84a. The stop members are normally extended so as to preclude downstream advancement of the bundle. Once the sensor detects an incoming bundle, the timing sequence is initiated whereby the bundle travels across the table surface, engages the stops, and the pins are selectively raised before rotation of the table. Just prior to rotation, the stops are retracted, and the entire bundle is rotated ninety degrees on the ring. Once the bundle has exited the table surface, the stops are biased outwardly for receipt of the next bundle. The stops may also be adjusted toward and away from the terminal edge of the table. This allows different size bundles to be accommodated on the bundle turner assembly.

It will also be recognized that the preferred embodiment can adopt various configurations. For example, individual cylinders may be used to lift the pins, and thus the bundle, above the surface of the table. Alternatively, an arcuate plate can be lifted by one or more cylinders so that the action of these individual cylinders 70 can be coordinated.

It is also preferred that the roller 78 be driven via belts 80. This assures that the bundle clears the table by way of a positive drive arrangement as opposed to the bundle potentially catching an edge on the adjacent downstream conveyer path which may alter the orientation of the bundle. Since the bundle is typically proceeding to a strapping assembly, it is important that proper orientation of the bundle be maintained.

The invention has been described with reference to the preferred embodiments. Of course, other arrangements of a minor variation are contemplated. The invention is intended to include all such alterations and modifications in so far as they come within the scope of the appended claims or the equivalents thereof.

Having thus described the invention, it is now claimed:

1. An apparatus for turning bundles of printed products comprising:
   a planar surface adapted to receive an associated bundle thereon from an upstream station;
   a sensor for detecting movement of an associated bundle on to the surface;
   a timing sequence for synchronizing movement of the bundle based on the sensor detecting an associated bundle;
   a stop adapted to engage an associated bundle and limit further movement thereof on the surface;
   a variable speed driven belt operatively interconnected with the sensor for decelerating the bundle prior to engagement with the stop based on the timing sequence;
   an assembly for rotating the surface through ninety degrees in response to a signal from the sensor; and
   a drive assembly for urging an associated bundle from the surface after completion of the rotation.

2. The apparatus of claim 1 wherein the rotating assembly includes a lifting apparatus that lifts the associated bundle from the surface prior to rotation and lowers the associated bundle at the end of the rotation.

3. The apparatus of claim 2 wherein the lifting apparatus includes a portion of the planar surface that is selectively raised and lowered relative to the remainder of the planar surface.

4. The apparatus of claim 3 wherein the planar surface portion is an annular surface.

5. The apparatus of claim 1 wherein the drive assembly includes a belt drive for advancing the associated bundle from the planar surface.

6. The apparatus of claim 1 wherein the stop is adjustable along the planar surface for accommodating different size bundles.

7. The apparatus of claim 1 wherein the stop includes first and second pins disposed in spaced relation and adapted for selective actuation above the planar surface as an incoming associated bundle approaches and deactuation below the planar surface to allow the bundle to move to an associated downstream station.

8. The apparatus of claim 1 wherein the decelerating member is disposed within the rotating assembly.

9. The apparatus of claim 1 wherein the decelerating member is selectively operated in conjunction with the drive assembly to move an associated bundle from the planar surface.

10. The apparatus of claim 1 wherein said sensor is a photoelectric sensor.

11. An apparatus for turning bundles comprised of:
- a planar surface for receiving a bundle from an upstream station;
- a sensor for detecting movement of said bundle onto said planar surface;
- a timing sequence for synchronizing movement of said bundle based on a signal from the sensor;
- a variable speed driven belt operatively communicating with said sensor for decelerating said bundle;
- a stop mechanism for engaging said bundle and to limit further movement of the bundle upon deceleration to a complete stop;
- an assembly for rotating an annular portion of the planar surface in response to the sensor signal; and,
- advancing said bundle from the planar surface to a downstream station via the driven belt upon completion of rotation.

12. A method for turning bundles comprising the steps of:
- receiving a bundle onto a planar surface from an upstream station;
- detecting movement of said bundle on the planar surface via a sensor;
- synchronizing movement of said bundle via a timing sequence based on the sensor signal;
- decelerating said bundle via a variable speed driven belt, operatively connected with said sensor;
- engaging the bundle via a stop mechanism to limit further movement of the bundle;
- rotating a portion of the planar surface in response to a signal from the sensor; and,
- moving said bundle from said planar surface via the driven belt upon completion of rotation to a downstream location.

13. The method according to claim 12, further including the steps of selectively raising and lowering said portion of the planar surface relative to the remainder of the planar surface.

14. The method according to claim 12, wherein different size bundles can be accommodated by adjusting the stop along said planar surface.

15. The method according to claim 12, wherein the stop includes first and a second pins disposed in spaced relation and selectively actuating said at least first and second pins above the planar surface as an incoming bundle approaches and deactuating the pins below the planar surface to allow the bundle to move to a downstream station.

16. The method according to claim 12, wherein the detecting is performed via a photoelectric sensor.

17. The method according to claim 12, wherein the rotating is performed via an air cylinder which rotates said annular portion through ninety degrees.

* * * * *